No. 664,406. Patented Dec. 25, 1900.
H. HARMS & H. SEEGELKE.
POTATO HARVESTING MACHINE.
(Application filed Apr. 13, 1900.)
(No Model.) 7 Sheets—Sheet 1.

Witnesses:
Inventors:

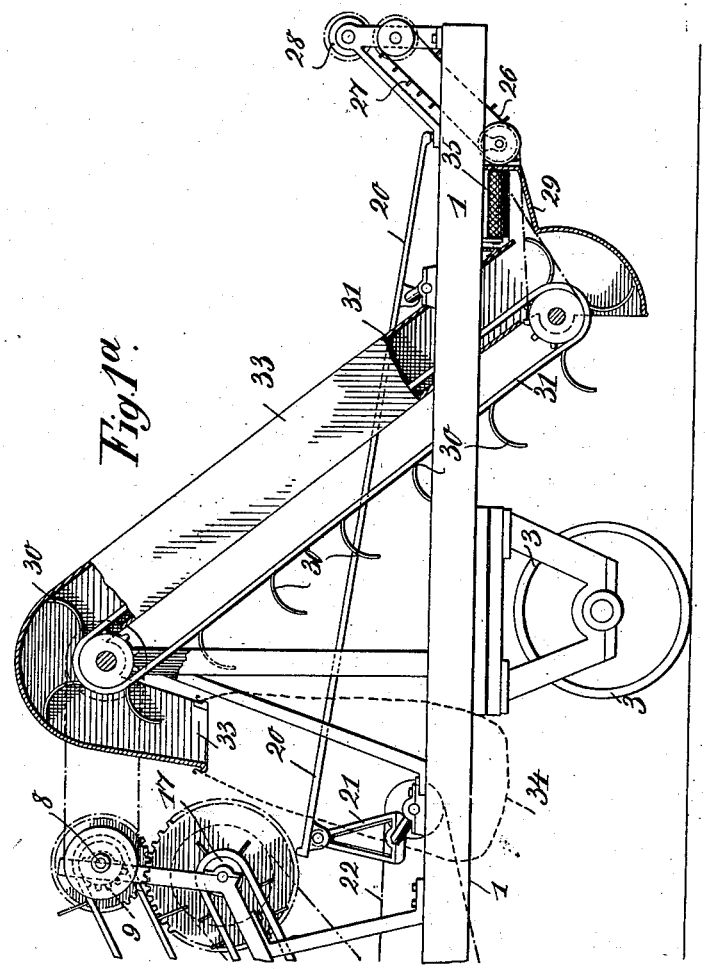

No. 664,406. Patented Dec. 25, 1900.
H. HARMS & H. SEEGELKE.
POTATO HARVESTING MACHINE.
(Application filed Apr. 13, 1900.)
(No Model.) 7 Sheets—Sheet 3.
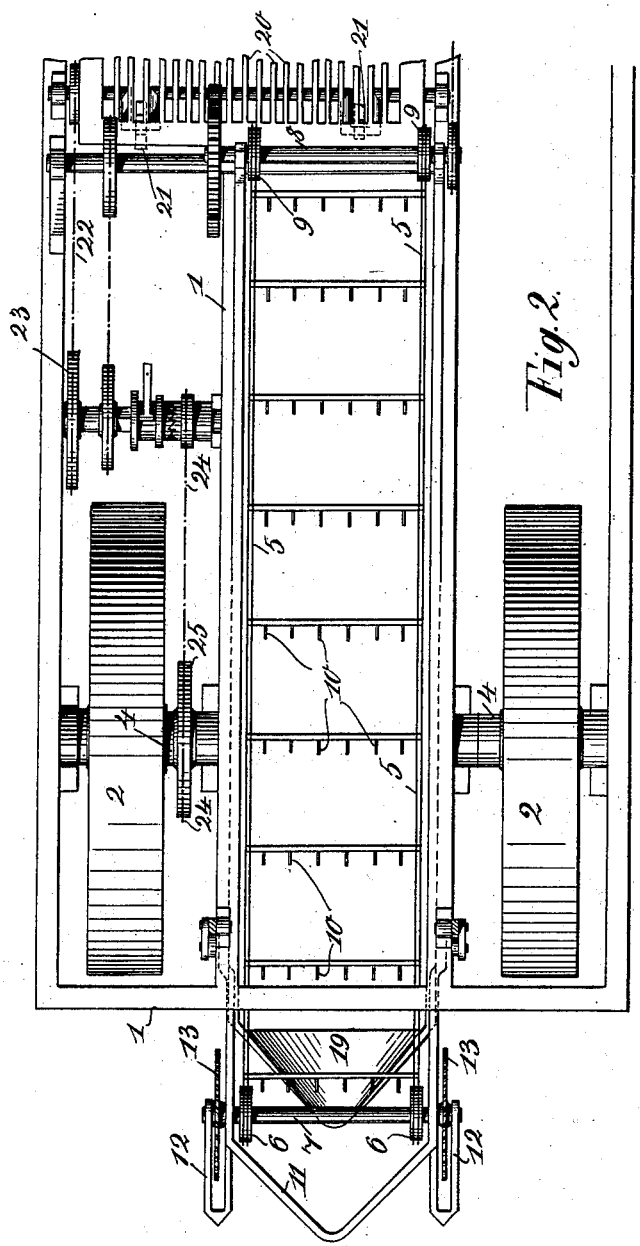
Witnesses:
Inventors:

No. 664,406. Patented Dec. 25, 1900.
H. HARMS & H. SEEGELKE.
POTATO HARVESTING MACHINE.
(Application filed Apr. 13, 1900.)

(No Model.) 7 Sheets—Sheet 4.

Witnesses:

Inventors

No. 664,406. Patented Dec. 25, 1900.
H. HARMS & H. SEEGELKE.
POTATO HARVESTING MACHINE.
(Application filed Apr. 13, 1900.)
(No Model.) 7 Sheets—Sheet 5.
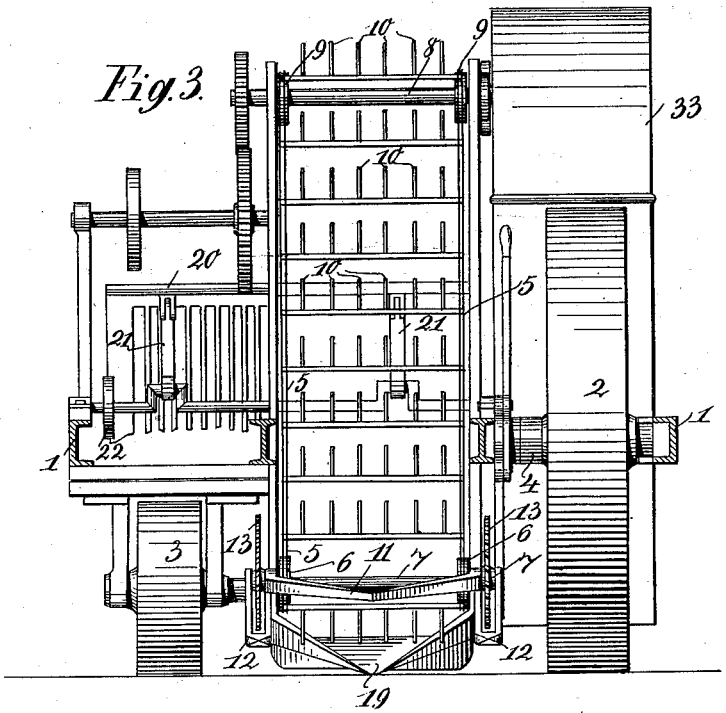
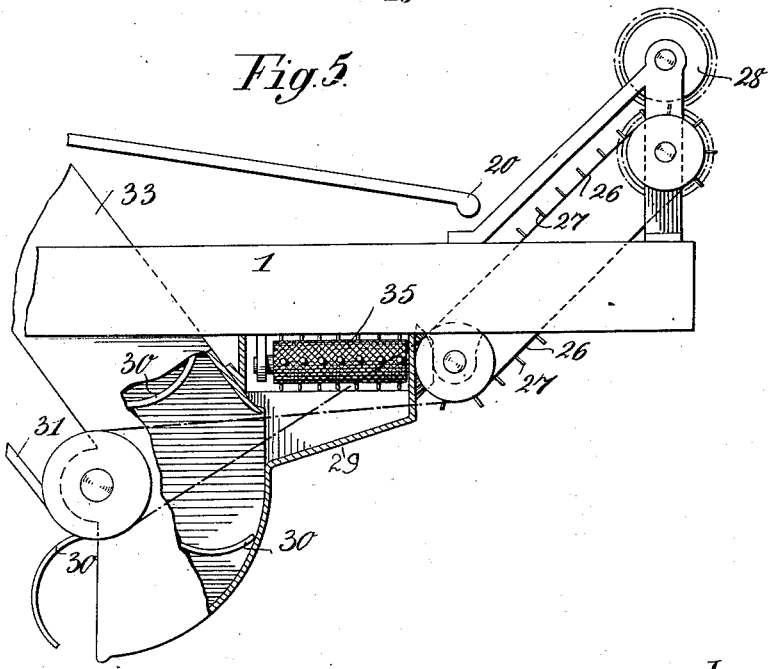
Witnesses:
Inventor:

No. 664,406. Patented Dec. 25, 1900.
H. HARMS & H. SEEGELKE.
POTATO HARVESTING MACHINE.
(Application filed Apr. 13, 1900.)

(No Model.) 7 Sheets—Sheet 6.

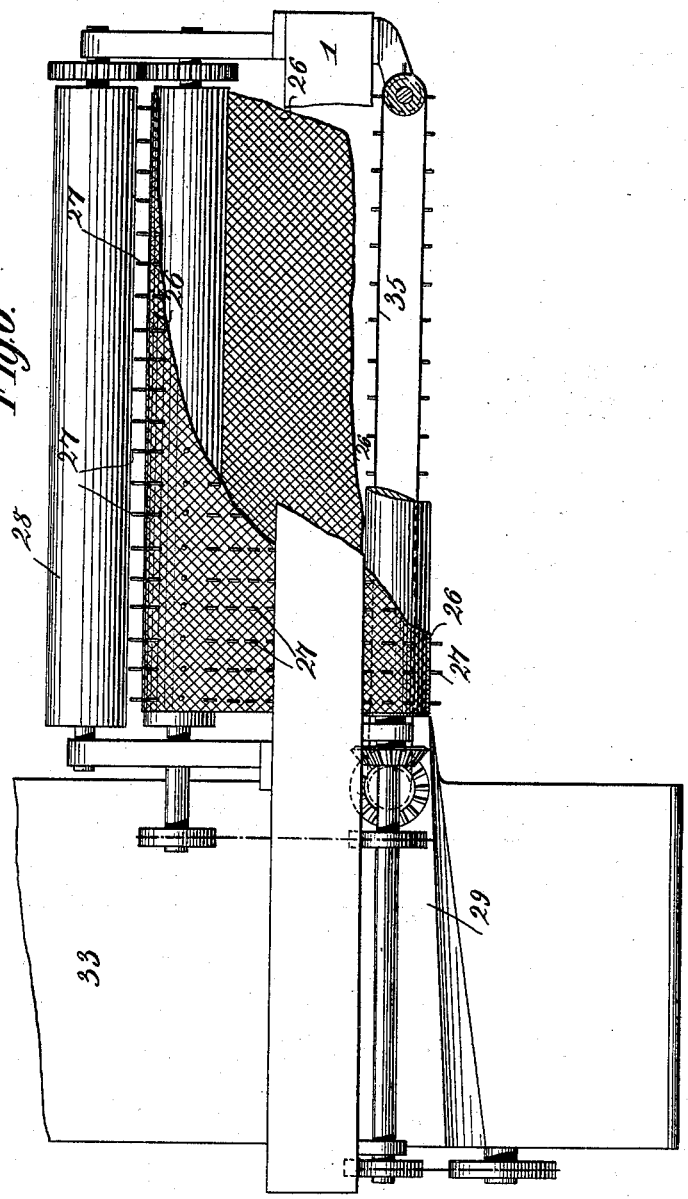

UNITED STATES PATENT OFFICE.

HINRICH HARMS AND HEINRICH SEEGELKE, OF EYSTRUP, GERMANY.

POTATO-HARVESTING MACHINE.

SPECIFICATION forming part of Letters Patent No. 664,406, dated December 25, 1900.

Application filed April 13, 1900. Serial No. 12,742. (No model.)

*To all whom it may concern:*

Be it known that we, HINRICH HARMS, blacksmith, and HEINRICH SEEGELKE, master blacksmith, subjects of the German Emperor, residing at Eystrup, in the province of Hanover, Germany, have invented new and useful Improvements in Potato-Harvesting Machines, of which the following is a specification.

The present invention relates to an improved potato-harvesting machine; and it has for its object to cut the plant or foliage from the potatoes and throw same aside before the latter are raised from the ground and, further, to separate the potatoes, cleaned from the adhering earth by means of the well-known vibratory sieve, from the root-stock, quick-grass, and other plants or foliage by means of a special device, whereupon the potatoes are elevated and conveyed to a sack, basket, or other receptacle suspended in the machine.

Other objects of the invention are to simplify and cheapen and to render more efficient, durable, and serviceable in operation this class of devices.

To these ends and to such others as the invention may pertain the same consists in the peculiar combination and in the novel construction, arrangement, and adaptation of parts, all as more fully hereinafter described, shown in the accompanying drawings, and then specifically defined in the appended claim.

Our improved potato-harvesting machine is illustrated in the annexed drawings, in which—

Figure 1:
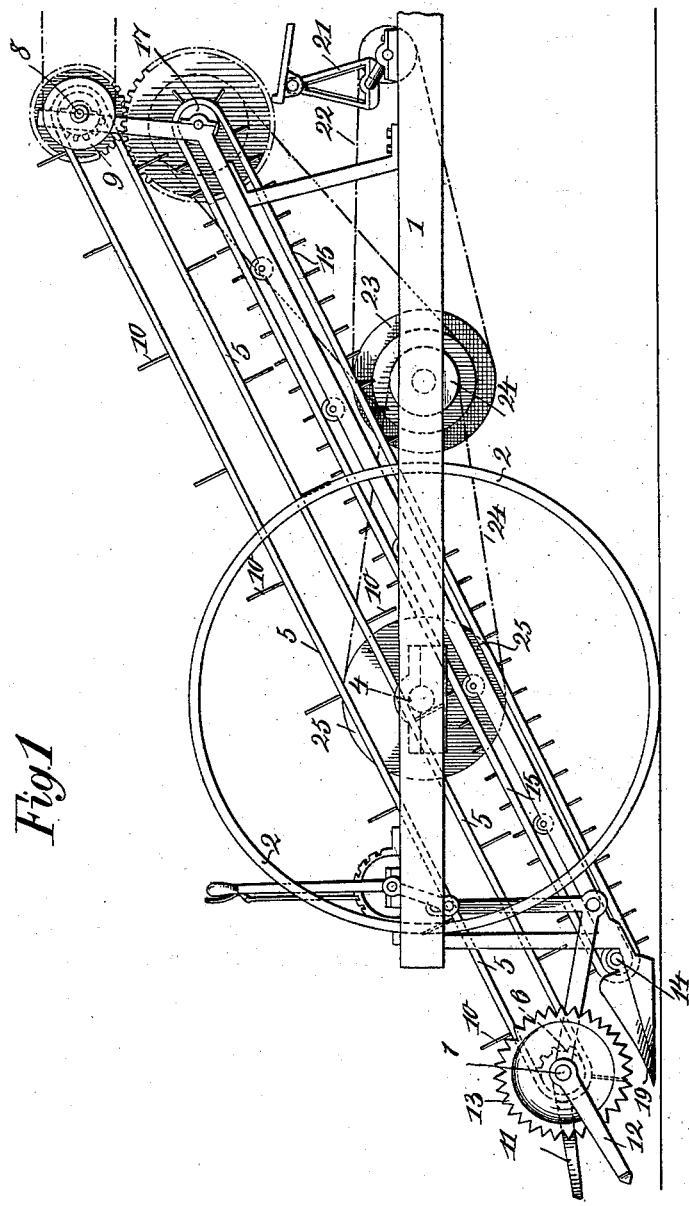
Figure 2A:
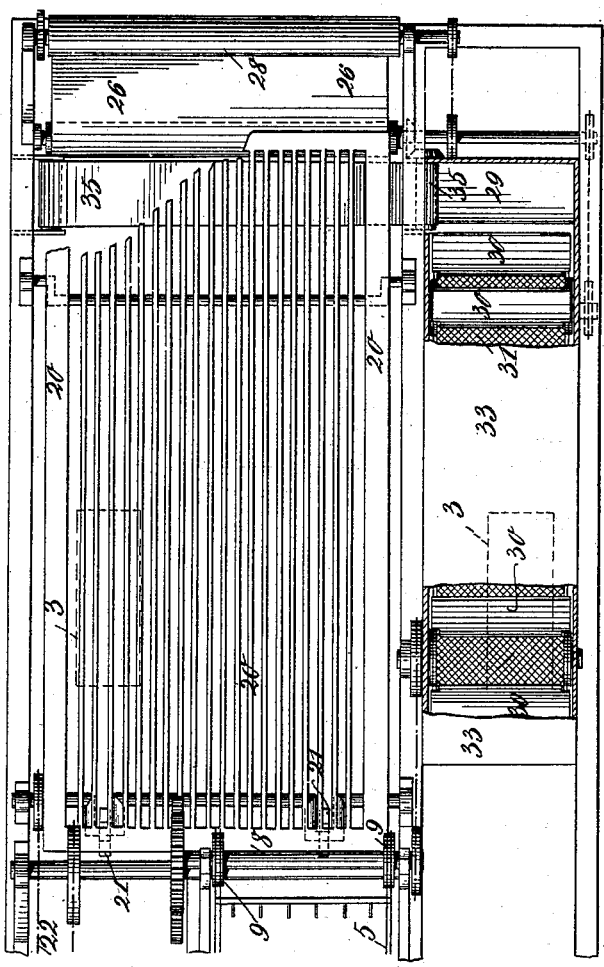
Figure 4:
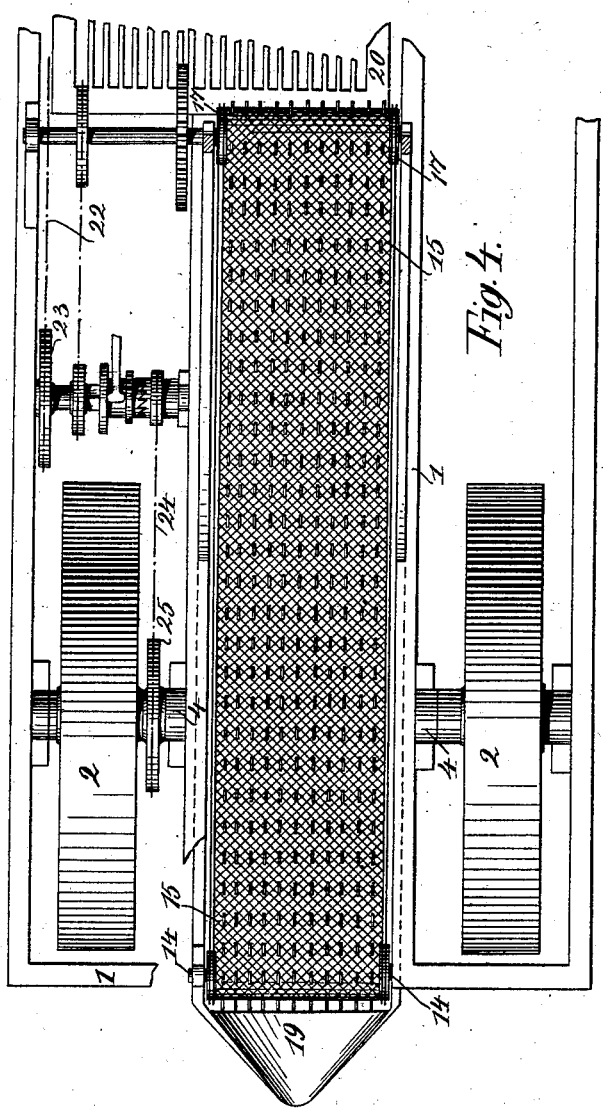

Figure 1 is a lateral elevation showing the front part, and in Fig. 1ª in a lateral elevation showing the back part, of the machine. Fig. 2 is a plan view showing the front part, and Fig. 2ª is a plan view showing the back part, of the machine. Fig. 3 is a front elevation of a portion of the machine, partly in section. Fig. 4 is a plan view of the front part of the machine. Figs. 5 and 6 illustrate details of construction on an enlarged scale.

The machine comprises, essentially, the frame 1, the front wheels 2, and the rear guide-wheels 3. From the axle 4 of the front wheels the various organs of the machine receive their impulse by means of a driving-chain and suitable power-transmission gear. An endless chain 5, running, on the one hand, over a toothed wheel 6, mounted on a shaft 7, supported in an extension of the frame 1 in front of the wheels 2, and, on the other hand, over a toothed wheel 9, mounted on a shaft 8, situated between the front wheels 2 and the rear wheels 3, above the main frame 1, carries spikes 10 at suitable distances apart, which serve for the purpose of preventing the clods raised from falling back. At the right and left of the lower shaft 7 pointed arms 12 for raising the plants and an angular arm 11, serving a similar purpose, are provided. In the pointed arms 12 rotary knives 13, mounted on the shaft 7, are located. Below the endless chain 5 an elevator-chain 15 of any suitable construction is arranged, which runs over a toothed wheel mounted on the shaft 14 and over a toothed wheel 17, supported about the center of the main frame 1 and above same. The endless chain 5 receives its motion from the shaft of the toothed wheel 17 for the elevator-chain 15. Below the elevator-chain 15 the share 19 is supported, the pointed front end of which is between and beneath the rotary cutters 13. Beneath the toothed wheel 17 for the elevator-chain 15 the vibratory sieve 20 is located, which is actuated by means of cams 21 and which receive their impulse by means of suitable transmission-gear 22 from the pulley 23. Said pulley 23 in its turn is driven by means of the transmission-gear 24 from the chain-wheel 25, mounted on the axle 4 of the front wheels. The vibratory sieve 20, which is inclined toward the rear, terminates above a rake 26, supported at the rearward end of the machine. Said rake 26 consists of an endless chain fitted with small spikes 27, and it is guided beneath a rotary roller 28, located in the frame of the machine, standing a distance apart from this roller 28 small enough to prevent the potatoes from passing between. Below the vibratory sieve 20 a transporter 35 is arranged, which serves for the purpose of guiding the potatoes returned from the rake 26 to the collecting-dish 29 adjacent to the elevator 31. The lower end of this collecting-dish 29 is bent in such a manner that the blades 30, mounted on the elevator-chain 31, close same toward the bottom. The elevator-chain 31 moves in a casing 33, the downwardly-leading end of which terminates funnel-like. Beneath this funnel-like end of the elevator-casing 33 a receiver 34 for the potatoes is suspended in any suitable and convenient manner. The machine is further provided with a seat for the driver and the necessary appliances for pulling and guiding same, as well as brake and all other accessories necessary for a machine of this kind.

Our improved potato-harvesting machine operates in the following manner: The front arms 12 raise the potato-plants, while the angular arm 11 receives same and brings them in front of the rotary cutters 13, which cut the plant off, the latter by virtue of the angular configuration of the arm 11 being deposited on the ground laterally of the clod containing the potatoes to be harvested. By means of the share 19 the root-stocks, with the potatoes and soil adhering thereto, are raised and brought onto the elevator 15, while the spikes 10 of the endless chain 5 prevent their falling back. The elevator 15 conveys the root-stocks, with the potatoes and soil, to the vibratory sieve 20 in the well-known manner, the potatoes being separated from the soil or earth by the action of the sieve 20, which causes the earth to drop through its meshes or holes, the thus cleaned potatoes reaching the rake 26. The spikes 27 of this rake 26 arrest the quick-grass and the like adhering to the potatoes, which are conveyed toward the roller 28, where the potatoes which still cling to the quick-grass are separated, returned, and conveyed from the transporter 35 to the collecting-dish 29, where the other potatoes have been collected. Roots, quick-grass, and the like carried by the spikes 27 pass the roller 28 and are deposited on the ground at the rear of the machine. The potatoes collected on the dish 29 are caught by the blades 30, elevated in the casing 33, and deposited, passing the funnel-like end of this casing, in the receptacle 34.

The transmission-gears of the machine are chosen in such a manner that the various organs of the machine receive their proper impulse.

What we claim as new, and desire to secure by Letters Patent, is—

The combination in a potato-harvesting machine of plant-raisers 11 and 12, rotary cutters 13 for separating the plant from the root-stock, a share for raising the root-stock and the earth adhering thereto, an elevator 15, an endless chain 5 with spikes 10 preventing the root-stocks from falling back in the elevator, a vibratory sieve 20, a rake 26, a roller 28 for separating the potatoes from the quick-grass and the like, a collecting-dish 29, a conveyer with blades 30 in a casing 33 for depositing the potatoes harvested in a suitable receptacle and transmission means for actuating the various organs from the wheels of the machine, substantially as described and shown.

In testimony whereof we have hereunto set our hands in presence of two subscribing witnesses.

HINRICH HARMS.
HEINRICH SEEGELKE.

Witnesses:
JAY WHITE,
LEONORE BASCH.